2,750,377
MONOAZO DYESTUFFS

Peter Hindermann, Batterie, Basel, and Jean-Pierre Jung, Riehen, near Basel, Switzerland, assignors to J. R. Geigy A. G., Basel, Switzerland, a Swiss firm No Drawing. Application April 28, 1952, Serial No. 284,818

Claims priority, application Switzerland May 15, 1951

7 Claims. (Cl. 260—198)

The present process concerns the production of valuable new monoazo dyestuffs which dye protein fibres, particularly wool, in fast shades from a neutral or weakly acid to a more strongly acid dye bath according to their composition, of which further details are given below.

The monoazo dyestuffs according to the present invention can be obtained by coupling the diazo compounds of monoamines of the general formula R—S—R'—NH$_2$ in an acid medium with 2-amino-8-hydroxynaphthalene-6-sulphonic acid. In this formula R and R' represent phenyl radicals which may contain the other substituents usual in azo dyestuffs and R' contains the amino group in the o-position to the sulphur atom forming the bridge.

Some of the monoamino compounds according to the present invention are already known; they can be obtained by known methods, for example, by condensing o-halogen nitrobenzenes with alkali salts of thiophenols and reducing the nitro group to the amino group. The nitrobenzenes may also contain for example, alkyl, sulphonic acid, sulphonic acid amide, sulphonic acid dialkylamide, sulphonic acid phenyl ester, methyl sulphonyl, carboxylic acid alkyl ester and acylamino groups and, advantageously, halogen atoms, in particular chlorine atoms, as further substituents.

If, in the diazo component of the monoazo dyestuffs according to the present invention, there are acid groups which solubilise the dyestuffs such as, for example, a sulphonic acid group, then they require a more strongly acid bath on dyeing wool than would be necessary for the dyeing with analogous dyestuffs not containing such groups in the diazo component. The latter dyestuffs are to be preferred because a lesser amount of acid is needed for dyeing and thus the wool is less affected by the dyeing process. Of these dyestuffs, those which contain a chlorine atom in the benzene ring containing the azo group, which chlorine atom is in the p-position to the sulphur atom forming the bridge, are particularly valuable. However, with regard to the affinity to wool from even a neutral bath, the purity of shade and the wet fastness and, in particular, the fastness to milling and sea water of the dyeings attained, the most valuable group consists of those monoazo dyestuffs according to the present invention which are derived from 2-amino-4-chlorothiodiphenyl ether which contain further substituents such as, e. g. chlorine, acylamino or carboxylic acid ester groups in particular also in the other benzene ring of the diazo component, the substitution being preferably in the o- and/or p-position to the sulphur atom forming the bridge.

In the form of their alkali salts, the monoazo dye-stuffs according to this invention are dark red powders which dissolve well in water with a red colour and produce blueish-red dyeings on wool which have good fastness to light.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

33.55 parts of 2-amino-4-chlorodiphenyl sulphide-2'-carboxylic acid-n-butyl ester are ground with 25 parts of 30% hydrochloric acid and 25 parts of water and diazotised in the usual way with 6.9 parts of sodium nitrite. A weakly acid to litmus solution of the sodium salt of 23.9 parts of 2-amino-8-hydroxynaphthalene-6-sulphonic acid in 35 parts of water is added to the cold diazo solution. The coupling begins with an acid reaction to Congo red and is finished by the dropwise addition of sodium acetate solution. The monoazo dyestuff of the formula:

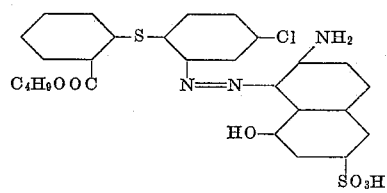

is isolated and dried after the coupling liquid has been made soda alkaline.

It is a dark red powder which dissolves in hot water with a red and in concentrated sulphuric acid with a blue-violet colour. The new dyestuff dyes wool in bluish-red shades which have very good fastness properties from a neutral or weakly acid bath.

Example 2

32.7 parts of 2-amino-2'-acetylamino-4.4'-dichloro-1.1'-diphenyl sulphide are finely dispersed in 25 parts of 30% hydrochloric acid and 25 parts of water and then diazotised in the usual way with 6.9 parts of sodium nitrite. A weakly acid to litmus solution of the sodium salt of 23.9 parts of 2-amino-8-hydroxynaphthalene-6-sulphonic acid in 35 parts of water is added to the cold diazo solution. The excess mineral acid is neutralised with sodium acetate and on completion of the coupling, the precipitated monoazo dyestuff of the formula:

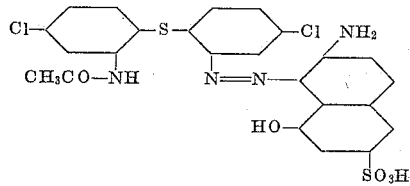

is filtered off, washed with sodium chloride solution and dried. It is a red-brown powder which dissolves in hot water with a bluish-red and in concentrated sulphuric acid with a blue-violet colour. It dyes wool in bluish-red shades from a neutral or weakly acid bath. The dyeings have very good wet fastness and good light fastness properties.

Example 3

27 parts of 2-amino-4.4'-dichloro-1.1'-diphenyl sulphide are dissolved in 135 parts of glacial acetic acid and 30 parts of 30% hydrochloric acid and then diazotised with 6.9 parts of sodium nitrite. The diazo solution is diluted with 150 parts of water and then poured into a weakly acetic acid aqueous solution of the sodium salt of 23.9 parts of 2-amino-8-hydroxynaphthalene-6-sulphonic acid. The coupling begins with an acid reaction to Congo red and is ended by the dropwise addition of sodium acetate solution. To isolate the monoazo dyestuff obtained of the formula:

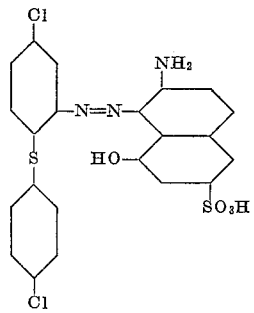

the coupling liquid is made soda alkaline, heated, sodium chloride is added and the dyestuff which precipitates is filtered off under suction while still warm and dried.

It is a dark red powder which dissolves in hot water with a red and in concentrated sulphuric acid with a blue-violet colour. The new dyestuff dyes wool a bluish-red shade from a neutral or weakly acid bath. The dyeing has good fastness to light, milling and sea water.

*Example 4*

24.95 parts of 2-amino-4-chloro-4'-methyl-1.1'-diphenyl sulphide are diazotised with 6.9 parts of sodium nitrite and 30 parts of 30% hydrochloric acid as described in Example 2. Coupling with 23.9 parts of 2-amino-8-hydroxy-naphthalene-6-sulphonic acid and isolation of the monoazo dyestuff obtained of the formula:

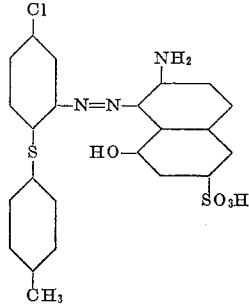

are performed as described in Example 3. The dyestuff is in the form of a red-brown powder which dissolves in water with a red and in concentrated sulphuric acid with a red-violet colour. It dyes wool from a neutral or weakly acid bath in clear bluish-red shades. The dyeings have very good wet fastness properties.

*Example 5*

27 parts of 2-amino-2'.4-dichloro-1.1'-diphenyl sulphide are diazotised as described in Example 3 in a solution of glacial acetic acid with 6.9 parts of sodium nitrite and 30 parts of 30% hydrochloric acid. The diazo solution is diluted with water and a weakly acetic acid aqueous solution of the sodium salt of 24 parts of 2-amino-8-hydroxynaphthalene-6-sulphonic acid is added. After neutralising the mineral acid with diluted caustic soda lye until there is a weakly acid reaction to litmus, the precipitated monoazo dyestuff of the formula:

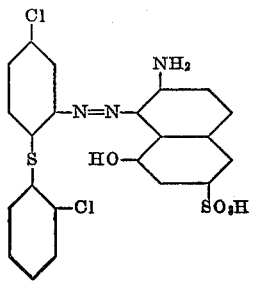

is filtered off, washed with common salt solution and dried. It is a dark red powder which dissolves in warm water with a red and in concentrated sulphuric acid with a blue-violet colour. From a neutral or weakly acid bath, the dyestuff produces bluish-red shades on wool which have very good fastness to milling, seawater and good fastness to light.

*Example 6*

A bath is prepared containing 1 part of the dyestuff obtained according to Example 2, 2 parts of acetic acid and 10 parts of Glauber's salt in 3,000 parts of water. 100 parts of wool flannel are entered at 45°, the bath is brought evenly to the boil within 30 minutes and boiled for a further 45 minutes to 1 hour, after which the dyed goods are rinsed. A very even bluish-red wool dyeing is obtained which is very fast to milling, sea water and light.

Very similar dyeings are obtained if instead of 2 parts of acetic acid, 2 parts of ammonium sulphate or 3 parts of ammonium acetate are added. A little additional acetic acid may be added if desired to completely exhaust the bath.

The monoamines necessary to perform the process according to the present invention are produced in the following manner:

14.45 parts of 2-chlorothiophenol are condensed with 19.2 parts of 2-nitro-1.4-dichlorobenzene in 100 parts of boiling alcohol for 2 hours to produce 2-nitro-2'.4-dichloro-1.1'-diphenyl sulphide and the nitro group is reduced according to Béchamp. The melting point of 2-amino-2'.4-dichloro-1.1'-diphenyl sulphide is 85.5–86.5°. 2-amino-4.4'-dichloro-1.1'-diphenyl sulphide (M. P. 69–70°) and 2-amino-2'.4.4'.5'-tetrachloro-1.1'-diphenyl sulphide (M. P. 153–154°) are obtained in an analogous manner from the corresponding starting materials.

The following table gives further monoazo dyestuffs according to this invention and also the shades in which they dye wool, which can be produced according to the processes described in the examples above with 2-amino-8-hydroxynaphthalene-6-sulphonic acid as coupling component:

| No. | Diazo component | Shade on wool |
| --- | --- | --- |
| 1 | 2-amino-4.5-dichloro-4'-methyl-1.1'-diphenyl sulphide. | Bluish-red. |
| 2 | 2-amino-4-methyl sulphone-4'-chloro-1.1'-diphenyl sulphide. | Blue-red. |
| 3 | 2-amino-4-methyl sulphone-4'-methyl-1.1'-diphenyl sulphide. | Do. |
| 4 | 2-amino-4-chloro-4'-methoxy-1.1'-diphenyl sulphide. | Bluish-red. |
| 5 | 2-amino-2'-chloracetylamino-4.4'-dichloro-1.1'-diphenyl sulphide. | Do. |
| 6 | 2-amino-2'-propionylamino-4.4'-dichloro-1.1'-diphenyl sulphide. | Do. |
| 7 | 2-amino-2'-butyrylamino-4.4'-dichloro-1.1'-diphenyl sulphide. | Do. |
| 8 | 2-amino-4-chloro-2'-carboxy-1.1'-diphenyl sulphide. | Do. |
| 9 | 2-amino-4-chloro-1.1'-diphenyl sulphide-2'-carboxylic acid methyl ester. | Do. |
| 10 | 2-amino-4.4'-dichloro-1.1'-diphenyl sulphide-2'-carboxylic acid-n-butyl ester. | Do. |
| 11 | 2-amino-4-chloro-1.1'-diphenyl sulphide-4-sulphonic acid. | Do. |
| 12 | 2-amino-4'-methyl-1.1'-diphenyl sulphide-4-sulphonic acid. | Do. |
| 13 | 2-amino-4-chloro-1.1'-diphenyl sulphide-4'-dimethyl sulphamyl. | Do. |
| 14 | 2-amino-4-chloro-1.1'-diphenyl sulphide-4'-sulphonic acid-p-amyl-phenol ester. | Do. |
| 15 | 2-amino-4-chloro-1.1'-diphenyl sulphide-4'-sulphonic acid-decyl ester. | Do. |

What we claim is:
1. A monoazo dyestuff corresponding to the formula:

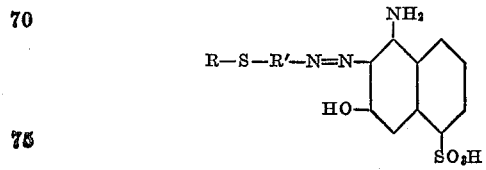

wherein R and R' each represent a mononuclear aryl radical and R' contains the azo group in the o-position to the sulphur atom forming the bridge.

2. A monoazo dyestuff corresponding to the formula:

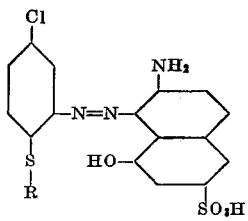

wherein R represents a mononuclear aryl radical.

3. A monoazo dyestuff corresponding to the formula:

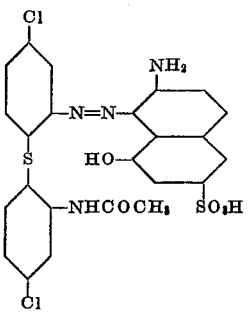

4. A monoazo dyestuff corresponding to the formula:

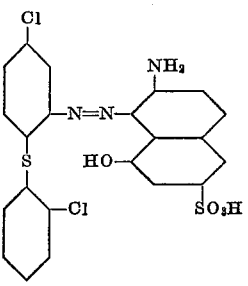

5. A monoazo dyestuff corresponding to the formula:

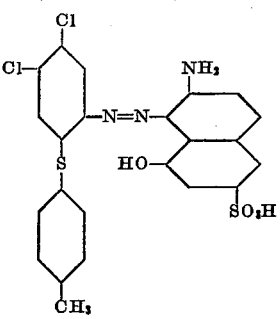

6. A monoazo dyestuff corresponding to the formula:

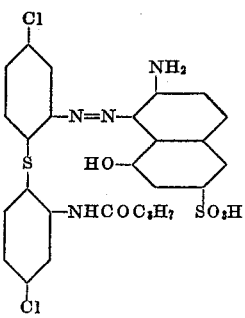

7. A monoazo dyestuff corresponding to the formula:

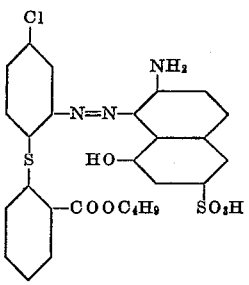

References Cited in the file of this patent
UNITED STATES PATENTS

| | | |
|---|---|---|
| 1,841,637 | Saunders et al. | Jan. 19, 1932 |
| 2,128,255 | Krzikalla et al. | Aug. 30, 1938 |
| 2,195,786 | Schmid | Apr. 2, 1940 |
| 2,505,533 | Felix et al. | Apr. 25, 1950 |
| 2,554,141 | Flory et al. | May 22, 1951 |